(12) United States Patent
Curran et al.

(10) Patent No.: US 7,397,659 B1
(45) Date of Patent: Jul. 8, 2008

(54) INTEGRATED DISPLAY COMPUTER WITH PERIPHERALS

(75) Inventors: Michael A. Curran, Westerville, OH (US); Gary A. Peck, Columbus, OH (US)

(73) Assignee: Micro Industries Corporation, Westerville, OH (US)

( * ) Notice: Subject to any disclaimer, the term of this patent is extended or adjusted under 35 U.S.C. 154(b) by 485 days.

(21) Appl. No.: 11/131,052

(22) Filed: May 17, 2005

Related U.S. Application Data

(63) Continuation-in-part of application No. 10/937,976, filed on Sep. 10, 2004, now Pat. No. 7,072,179.

(51) Int. Cl.
*H05K 5/00* (2006.01)
*H05K 7/00* (2006.01)

(52) U.S. Cl. ................ 361/686; 361/681; 361/683

(58) Field of Classification Search .......... 361/681, 361/683, 686
See application file for complete search history.

(56) References Cited

U.S. PATENT DOCUMENTS

| | | | |
|---|---|---|---|
| 4,771,365 A | | 9/1988 | Cichocki et al. ............ 361/387 |
| D359,273 S | * | 6/1995 | Dittmer ...................... D18/4.6 |
| 5,625,534 A | * | 4/1997 | Okaya et al. ............... 361/686 |
| 5,683,070 A | | 11/1997 | Seed ........................ 248/442.2 |
| 5,729,431 A | | 3/1998 | Marwah et al. ............. 361/687 |
| 5,742,690 A | | 4/1998 | Edgar ........................... 381/24 |
| 5,761,071 A | | 6/1998 | Bernstein et al. ........ 364/479.07 |
| 5,769,374 A | | 6/1998 | Martin et al. ............ 248/221.11 |
| 5,781,708 A | | 7/1998 | Austin et al. ............... 395/106 |
| 5,826,267 A | | 10/1998 | McMillan ...................... 707/9 |
| 5,831,816 A | * | 11/1998 | Johns et al. ................. 361/681 |
| 5,835,343 A | * | 11/1998 | Johns et al. ................. 361/681 |
| 5,978,225 A | * | 11/1999 | Kamphuis ................... 361/707 |
| 6,042,007 A | | 3/2000 | Nugent et al. ............... 235/383 |
| 6,052,279 A | * | 4/2000 | Friend et al. ................ 361/686 |

(Continued)

OTHER PUBLICATIONS

"Management Software for Interactive Terminals—Kiosks—Media Displays," Judos—Products, 2 pages from website, http://www.kudosdigital.com/products, Aug. 15, 2005.

(Continued)

*Primary Examiner*—Lisa Lea-Edmonds
*Assistant Examiner*—Anthony M Haughton
(74) *Attorney, Agent, or Firm*—Standley Law Group LLP

(57) ABSTRACT

A housing unit for attaching a peripheral device to an integrated display computer, and an integrated display computer with peripherals attached thereto. The peripherals are enclosed in a peripheral housing unit that is attached to a side of the computer that is adapted to accept the housing unit. The housing unit comprises an end cap and a shroud as well as internal components including an assembly bracket that are assembled to complete the unit. Only the portion of the peripheral or peripheral interface with which a user interacts is accessible through the housing unit. The remaining components are hidden within the housing unit. Various types of peripherals such as media card readers, bar code scanners, and magnetic card readers may be installed in the housing unit. Additionally, a housing unit that has an end cap and shroud but does not contain a peripheral may be attached to the computer. The peripheral housing unit gives each integrated display computer a similar, finished appearance regardless of which peripherals, if any, are enclosed.

20 Claims, 10 Drawing Sheets

U.S. PATENT DOCUMENTS

| | | | |
|---|---|---|---|
| 6,078,848 | A | 6/2000 | Bernstein et al. ............ 700/237 |
| 6,081,422 | A | 6/2000 | Ganthier et al. ............. 361/686 |
| 6,086,173 | A | 7/2000 | Restell .................... 312/223.3 |
| 6,181,554 | B1 | 1/2001 | Cipolla et al. ............... 361/687 |
| 6,234,389 | B1 * | 5/2001 | Valliani et al. .............. 235/380 |
| 6,241,149 | B1 | 6/2001 | Baitz et al. ..................... 235/7 |
| 6,290,517 | B1 | 9/2001 | Anderson ................... 439/131 |
| 6,324,056 | B1 | 11/2001 | Breier et al. ................ 361/687 |
| 6,336,615 | B1 | 1/2002 | Jeon ...................... 248/220.42 |
| 6,442,018 | B1 | 8/2002 | Dinkin ....................... 361/683 |
| 6,497,368 | B1 * | 12/2002 | Friend et al. .......... 235/472.01 |
| 6,502,076 | B1 | 12/2002 | Smith .......................... 705/14 |
| 6,507,352 | B1 * | 1/2003 | Cohen et al. ................ 715/817 |
| 6,532,152 | B1 | 3/2003 | White et al. ................ 361/692 |
| 6,839,227 | B1 | 1/2005 | Correa ....................... 361/683 |
| 6,842,333 | B2 * | 1/2005 | Lee et al. .................... 361/681 |
| 2001/0034664 | A1 | 10/2001 | Brunson ...................... 705/26 |
| 2003/0048256 | A1 | 3/2003 | Salmon ....................... 345/168 |
| 2003/0115096 | A1 | 6/2003 | Reynolds et al. ............. 705/14 |
| 2003/0161093 | A1 * | 8/2003 | Lam et al. ................... 361/681 |
| 2005/0019082 | A1 * | 1/2005 | Silverbrook ................ 400/693 |
| 2005/0057893 | A1 * | 3/2005 | Homer et al. ............... 361/683 |

OTHER PUBLICATIONS

TouchPoint Solutions, Inc.—Catapult Software, Catapult™, 2 pages from website, http://www.touchpointsolutions.com/site/technology/discover_catapult.html, Aug. 15, 2005.

"Microspace®-PC from Digital-Logic—the smallest and fanless computer for rough environmental conditions," Digital-Logic AG—Press Release, Nov. 2002, http://digitallogic.presseagentur.com/pr-infos/digitallogic/en/PR11-02.htm.

"Hush Debuts Fanless Pentium 4PC, Sleek-looking desktop keeps its cool quietly.," PC World, Sumner Lemon, IDG News Service, Sep. 23, 2003, http://www.pcworld.com/resource/printable/article/9,aid,112608,00.asp.

"Little PC's—Fanless," Stealth Computer Corporation, http://www.stealthcomputer.com/littlepc_fanless.htm, Apr. 22, 2004.

Copient Technologies, web page, 1 page, dated Mar. 9, 2005, from http://web.archive.org/web/20030724224421/http://www.copient-tech.com.

Copient Technologies, Products and Services, web page, 2 pages, dated Mar. 9, 2005, from http://web.archive.org/web/20030806105437/www.copienttech.com/pro...

* cited by examiner

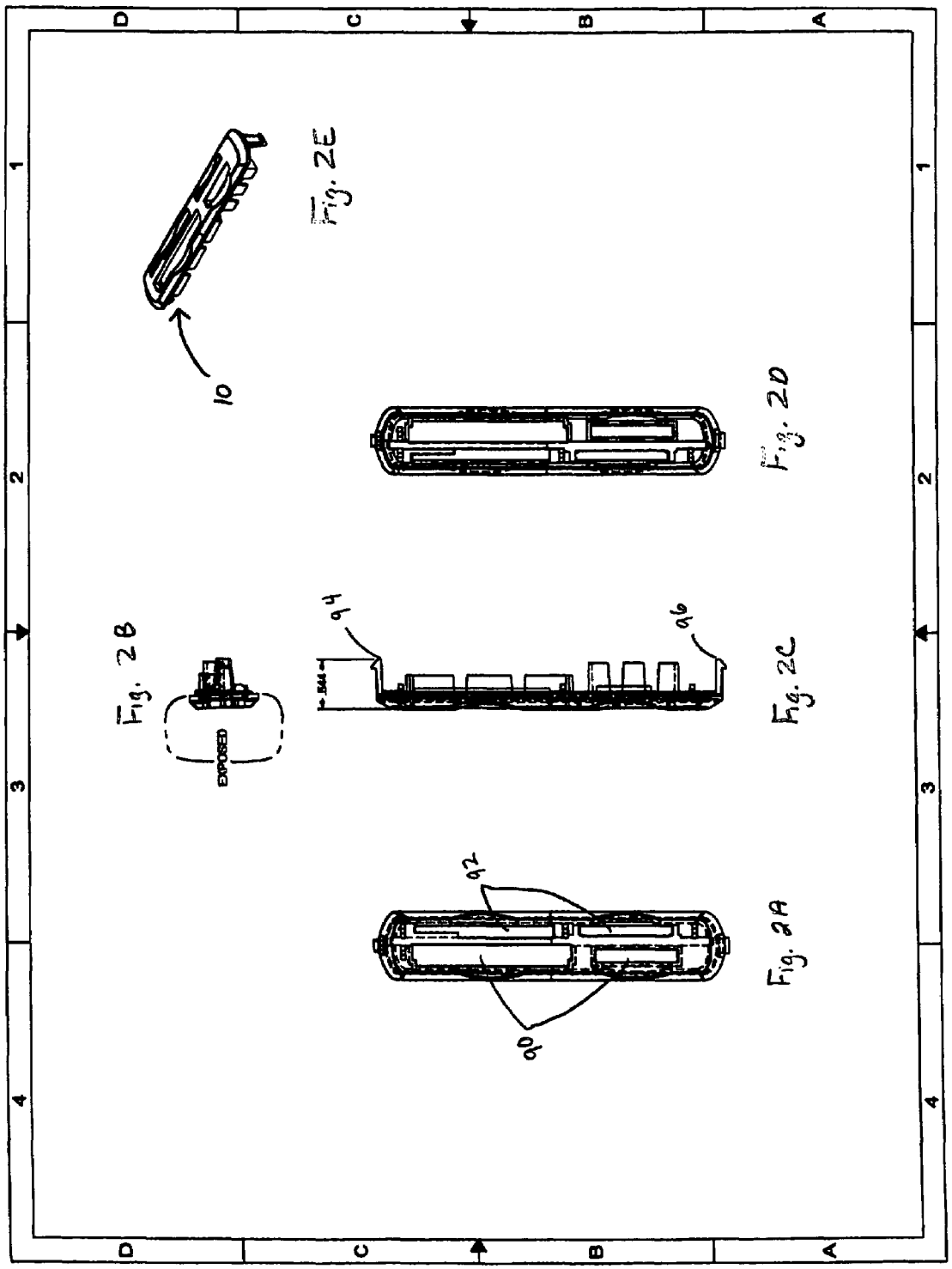

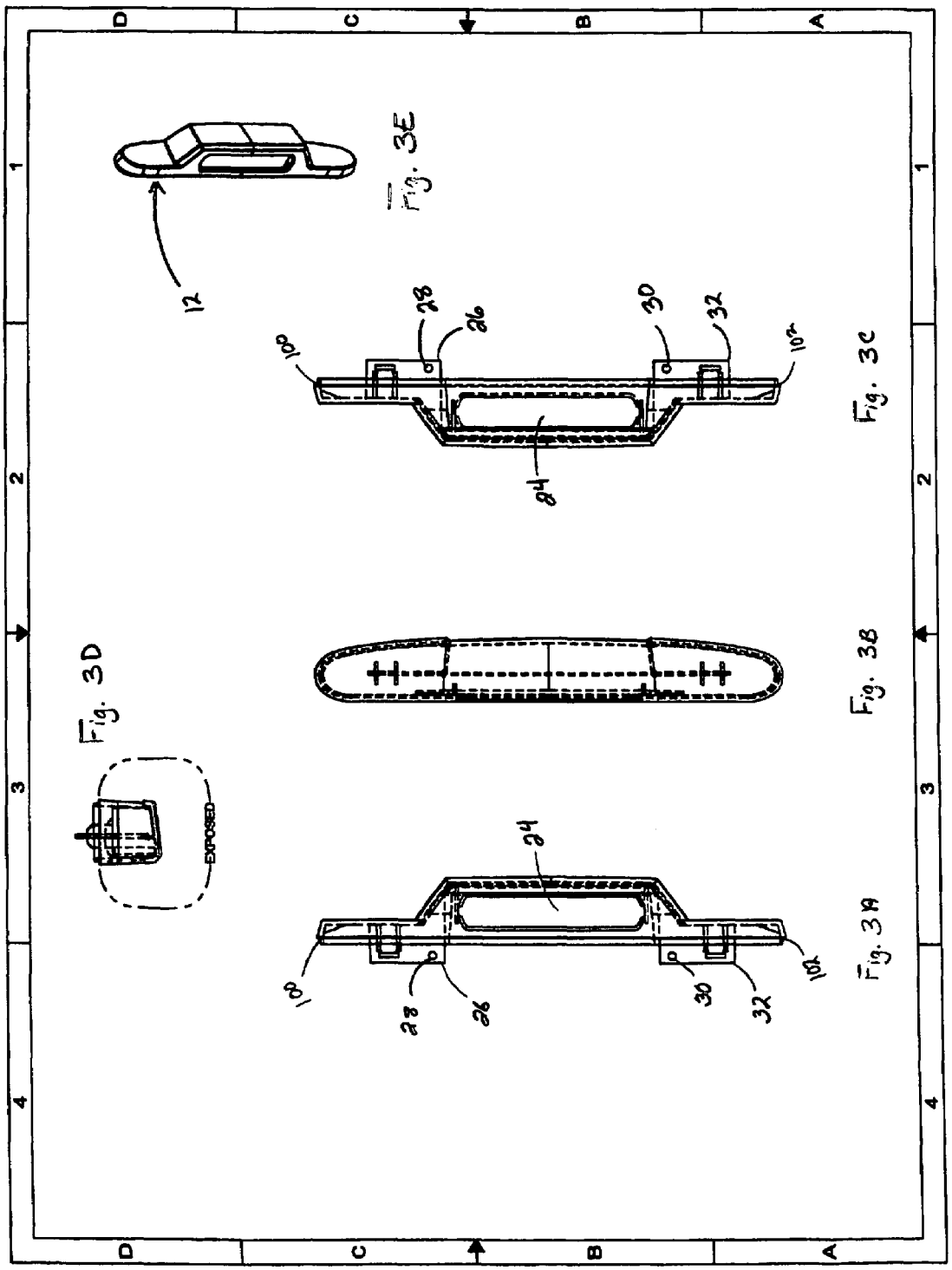

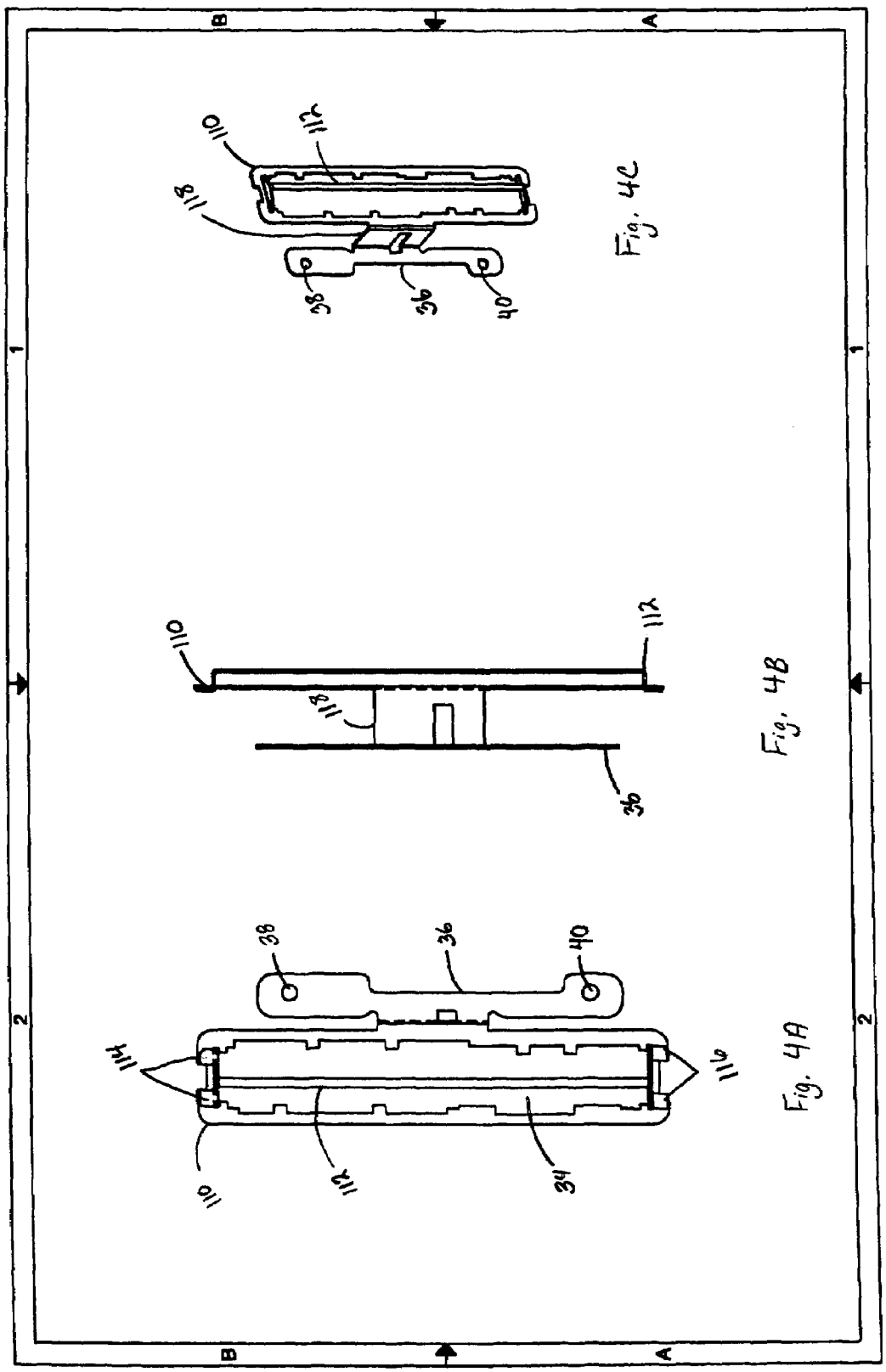

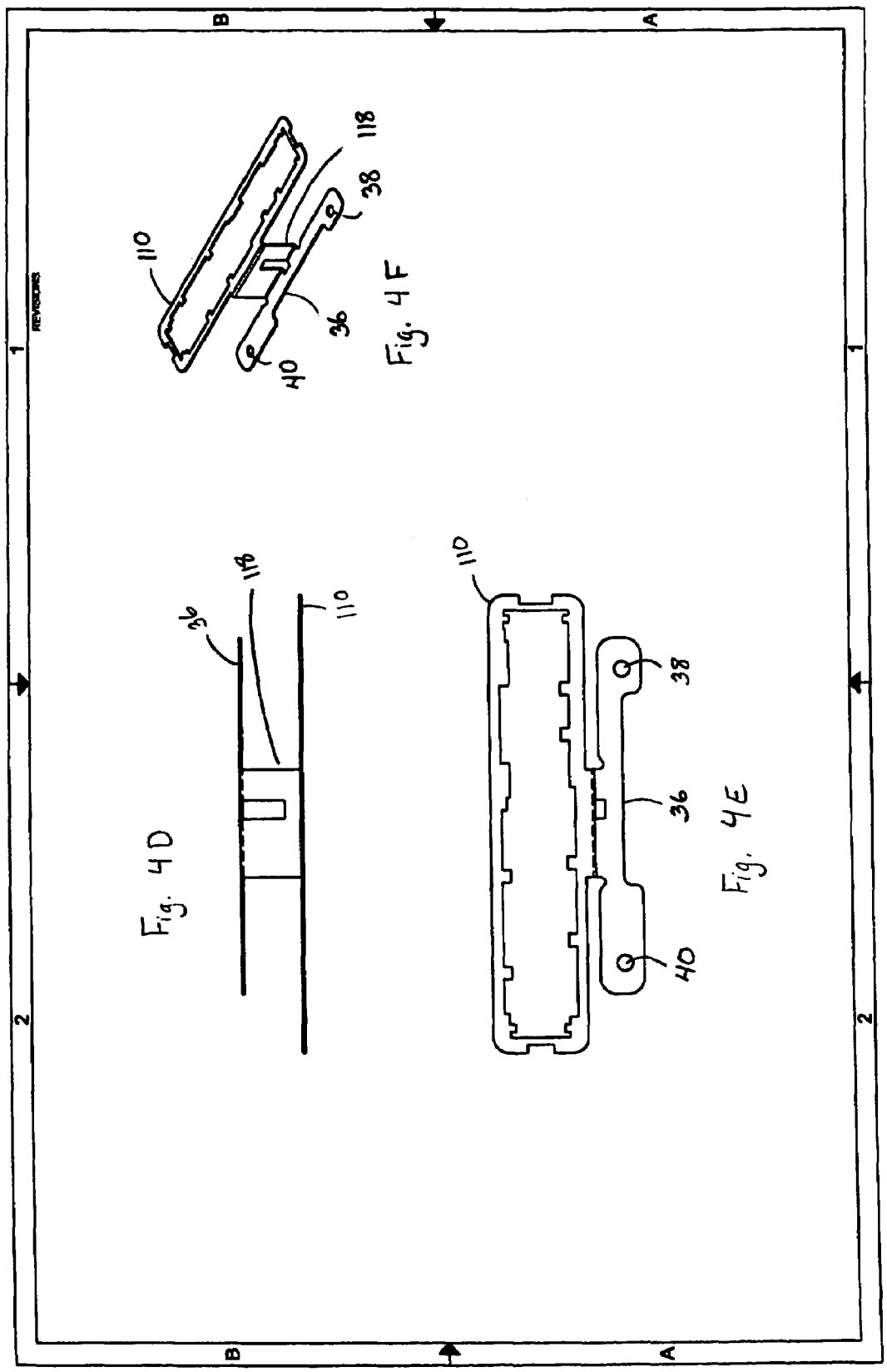

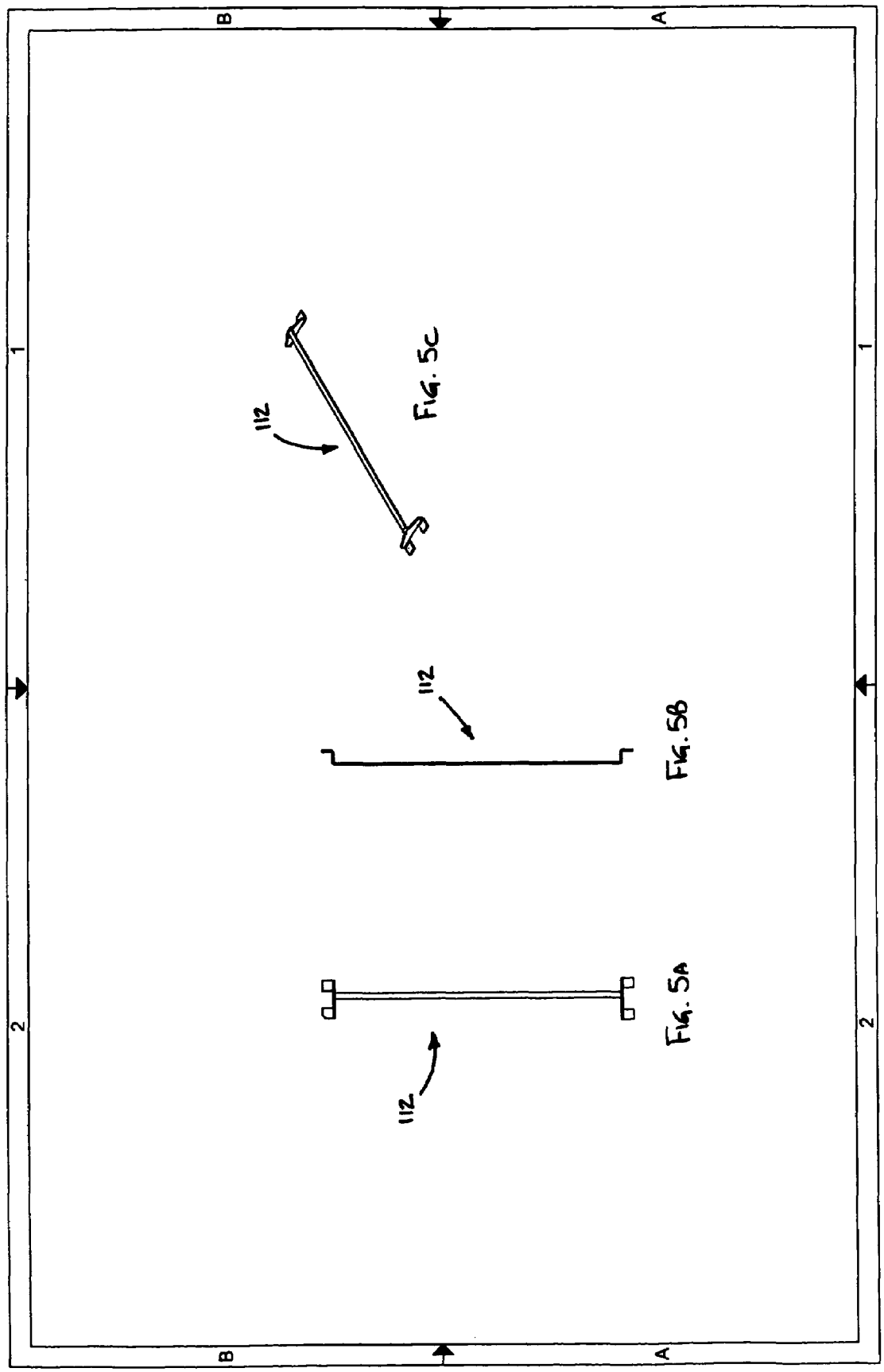

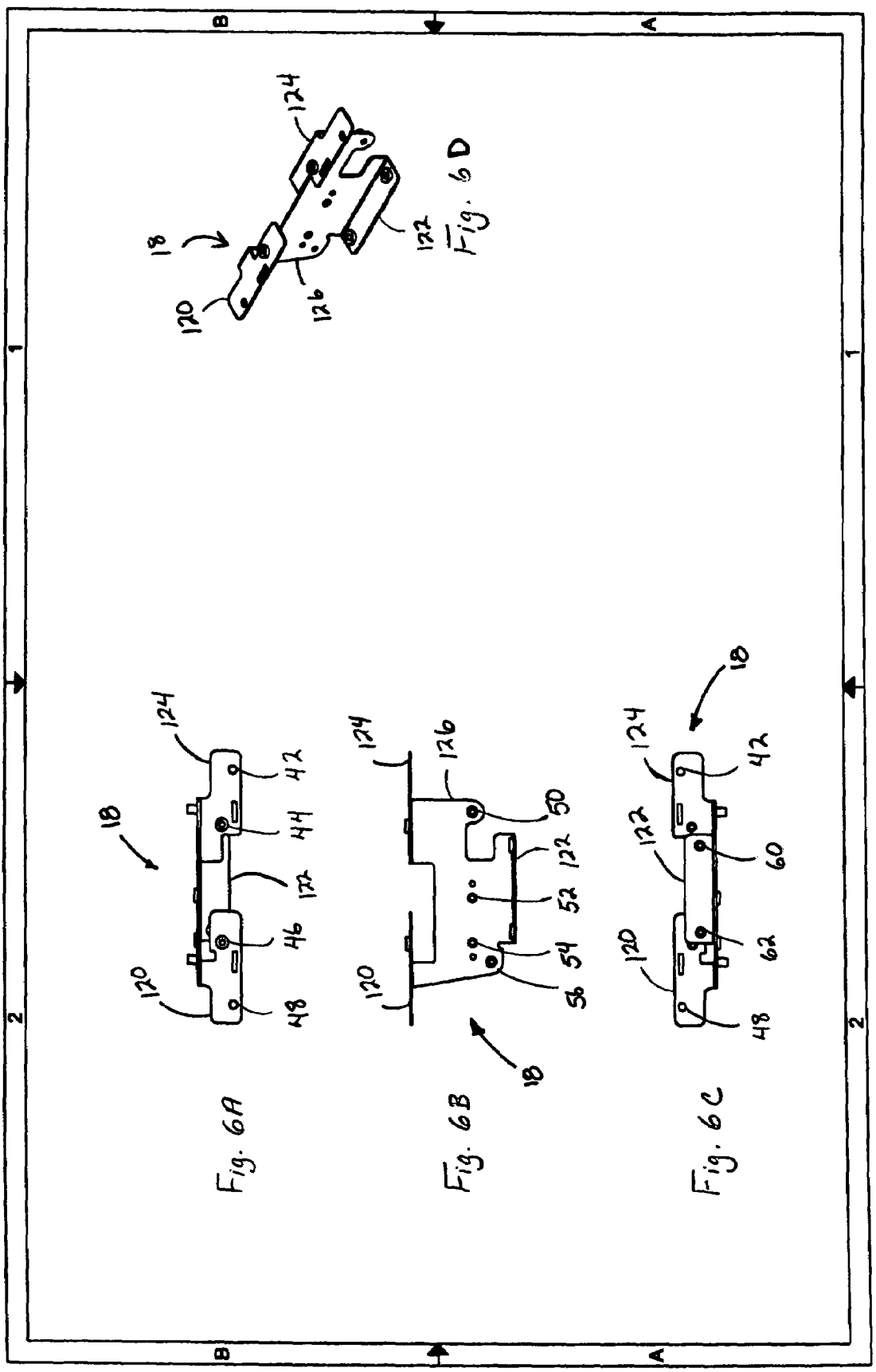

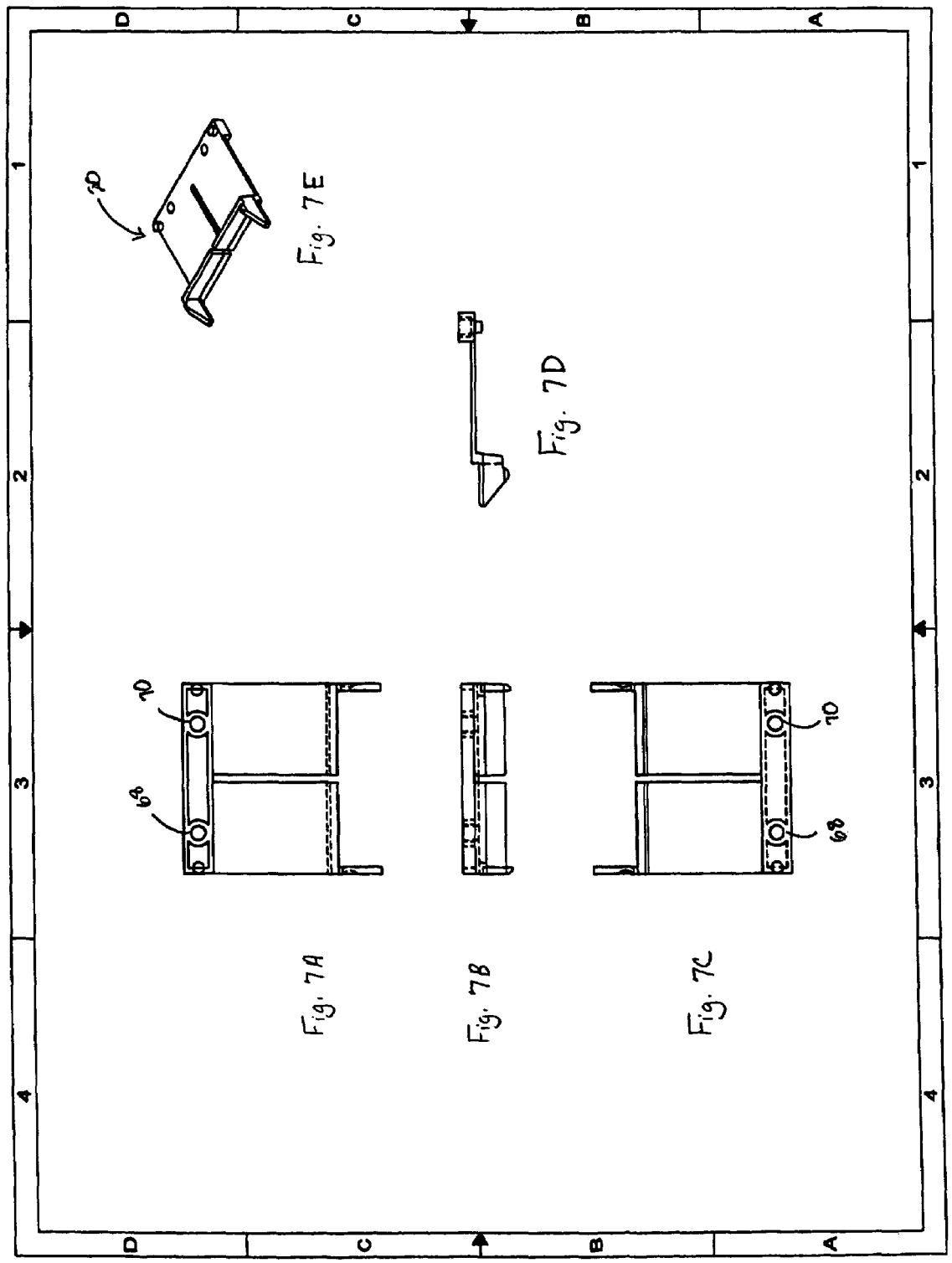

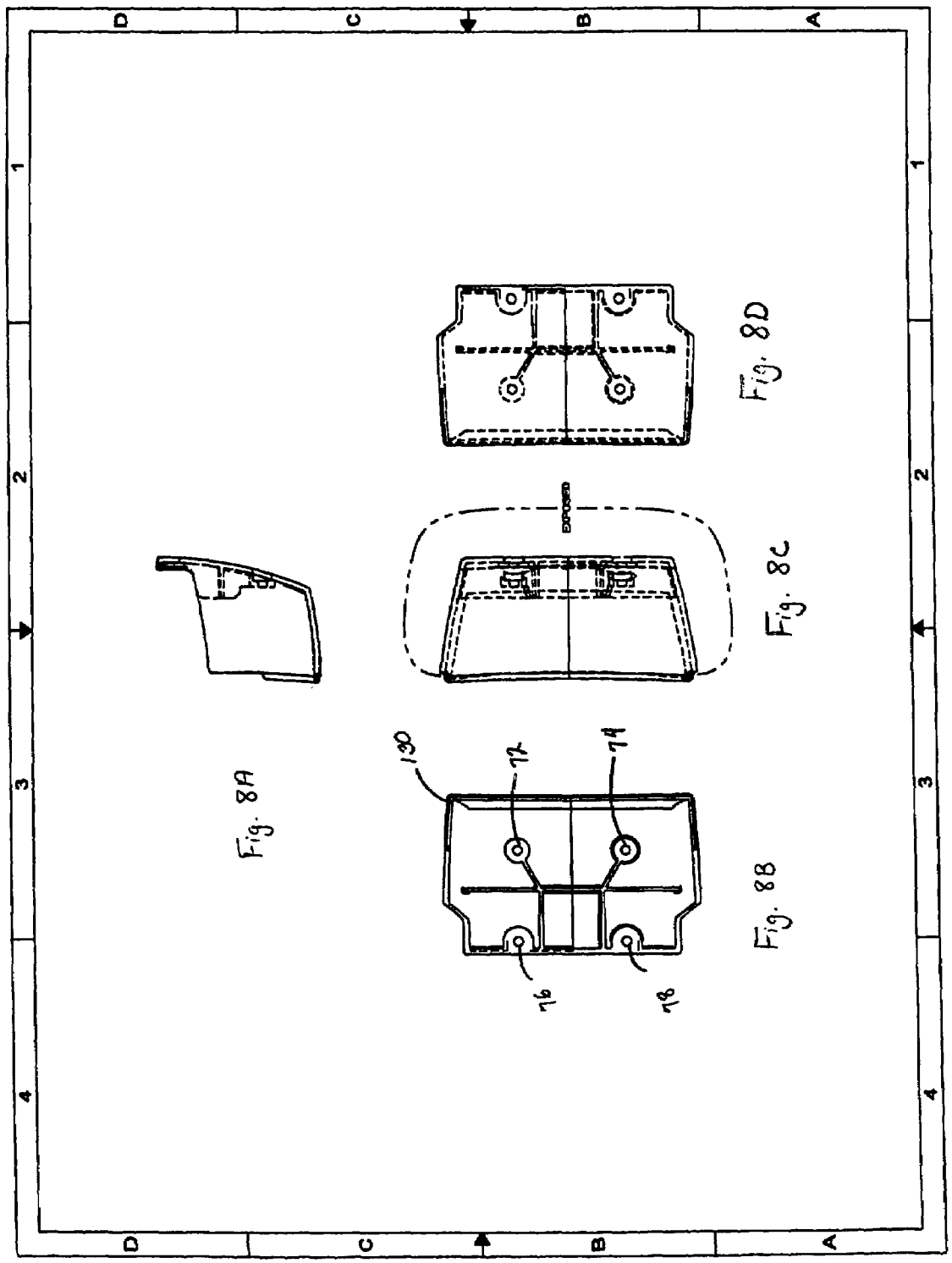

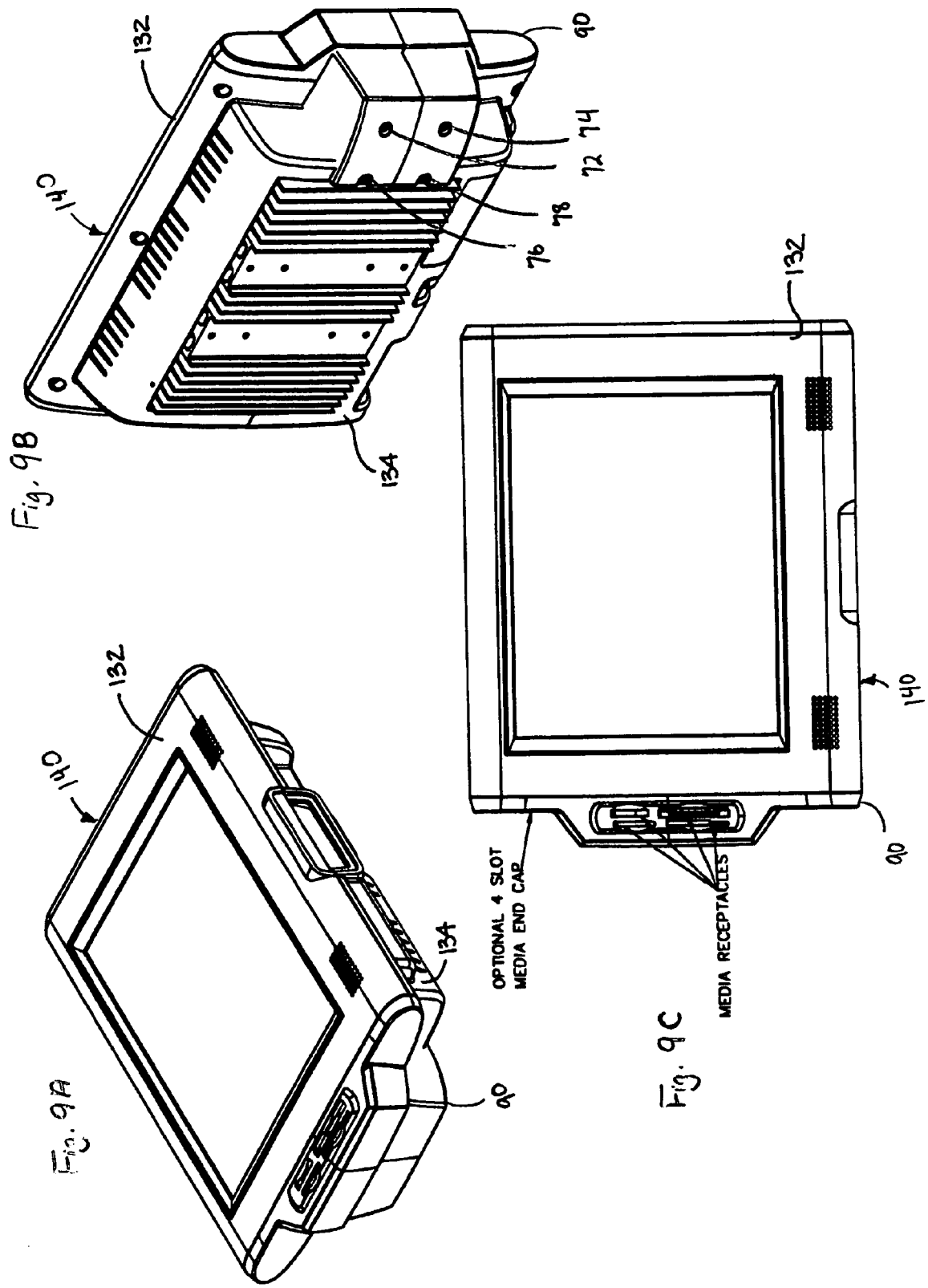

INTEGRATED DISPLAY COMPUTER WITH PERIPHERALS

CROSS REFERENCES TO RELATED APPLICATIONS

This application is a continuation-in-part application under 37 CFR 1.53(b) of application U.S. patent application Ser. No. 10/937,976, entitled Fanless Computer With Integrated Display and filed on Sep. 10, 2004 now U.S. Pat. No. 7,072,179, which is incorporated herein by reference.

FIELD OF THE INVENTION

The present invention relates generally to computers with integrated displays. More specifically, the present invention is directed to a housing unit that can be used to attach peripheral devices (peripherals) to either or both sides of an integrated display computer, and to an integrated display computer having one or more blank or peripheral-containing housing units attached thereto.

BACKGROUND OF THE INVENTION

Integrated display computers provide basic computer and monitor functionality in a compact package. Although they provide a great deal of functionality in a single package, the functionality is typically limited to the functionality of a simple desktop or tower computer and display unit. Additional functionality, which is often provided by peripherals that are connected to ports on the computer or display unit, is excluded from the integrated display computer because the additional devices increase the size or space needed for the unit so that it is no longer small and compact.

To accommodate the peripherals that some users may need, most integrated display computer manufacturers simply provide ports at various locations on the computer to provide connections for external devices. In some instances, a cable is used to connect the peripheral to the computer. The ports may be exposed or they may have a hinged cover that opens to accommodate the peripheral. While it is possible to attach and detach different peripherals, the connected peripherals require the availability of additional space around the unit to accommodate both the external device and in some cases, a cable. The resulting package is no longer compact. Furthermore, the result can be unsightly as various devices, and possibly cables, surround the integrated display computer. If the ports have covers, the covers are open and the devices or cables extend from the ports. If the ports do not have covers and devices are not attached to the ports, the ports simply remain exposed. The appearance of the integrated display computer may be altered dramatically as peripherals extend from around the computer. If the computer and devices are used in a commercial setting, the combination of components may appear complex and difficult to operate and therefore, unappealing to users.

In addition to changes in appearance, the use of ports and external devices can provide operational challenges. The ports allow devices to be attached and detached very easily. However, the ability to easily attach peripherals means they are subject to inadvertent detachment. If the integrated display computer is in use in a commercial setting, the peripherals may be subjected to heavy and continuous use increasing the likelihood that a peripheral becomes detached. Some users may simply be tempted to purposefully remove a peripheral. Whether peripheral devices are removed accidentally or purposefully, the expense of operating the computer increases due to increased device maintenance and replacement costs.

There is a need for an integrated display computer with peripherals that provides in a compact package not only basic computer and monitor functionality but additional functionality provided by peripherals. There is also a need for an integrated display computer that provides the additional functionality associated with various peripherals without significantly altering the appearance of the computer. Finally, there is a need for an integrated display computer with peripherals that are not easily removed.

SUMMARY OF THE INVENTION

The present invention is directed to a housing unit that can be used to attach peripherals to either or both sides of an integrated display computer, and to an integrated display computer having one or more blank or peripheral-containing housing units attached thereto. The present invention is based on a universal attachment design so that the integrated display computer can accept different types of peripherals. The peripherals are installed in a peripheral housing unit that is attached or affixed to a side of the computer which is designed to accept the housing unit. The housing unit comprises an end cap and a shroud as well as internal components including a mounting bracket that are assembled to complete the unit. The assembled peripheral housing unit is then attached or affixed to the computer. Peripheral-containing housing units according to the present invention may be attached to either or both sides of the computer. In the event only one peripheral is needed or no peripherals are needed, a "blank" housing unit which does not contain a peripheral device may be attached to the computer. The integrated display computer can accept a housing unit on each side regardless of whether it contains a peripheral.

A peripheral housing unit according to the present invention preferably incorporates all of the components of a peripheral such that only a portion of the peripheral or a peripheral interface with which a user interacts is exposed. The remaining components are hidden within the housing unit. The housing unit is attached to the sides of an integrated display computer such that there are no exposed ports or cables. Therefore, the integrated display computer with peripherals attached according to the present invention has the same streamlined, finished appearance as an integrated display computer that does not accommodate any peripherals.

Various types of peripherals such as media card readers, bar code scanners, magnetic card readers, etc. may be assembled in a housing unit according to the present invention. Because the integrated display computer can accommodate different types of peripherals, as well as "blanks," it can be configured for many different applications. For example, an integrated display computer with a media card reader may be used in a photograph printing application. Users may insert their media cards into an interface to a digital media reader and interact with the computer to edit and print photographs on their digital media cards. A computer with a bar code scanner may be used in a retail store setting. A computer with a magnetic card reader may be used in a library. Patrons of the library may swipe their library cards in the reader to complete a self-checkout process for items from the library.

The peripheral housing unit of the present invention gives each integrated display computer a similar, finished appearance regardless of which peripherals are enclosed therein. The use of "blanks" to finish the computer when peripherals are not required furthers the goal of providing a similar, finished appearance for all computers, regardless of their functionality. In settings for which many computers may be required (e.g., retail stores, schools, libraries, etc.), the similarity in appearance of the computers and the finished appearance of each computer may add to the attractiveness of the computers and entice patrons to use them. In addition, the absence of exposed ports, cables, and external devices enhances the appearance of the computers and reduces the likelihood that the devices will be detached from the computer.

In an example embodiment of the present invention, the peripheral housing units are assembled and attached or affixed to an integrated display computer during manufacturing. Once attached to the computer, the peripherals cannot be easily removed, whether accidentally or purposefully. Although the peripheral housing units are attached to the sides of the computer during an assembly process, they appear to be integrated with the display of the computer. The resulting product appears and operates as a single functional unit.

The peripheral housing unit of the present invention may further be used with a fanless integrated display computer. One such fanless integrated display computer that is especially well-suited to use for this purpose is described in U.S. patent application Ser. No. 10/937,976, entitled Fanless Computer With Integrated Display and filed on Sep. 10, 2004. The fanless integrated display computer described in U.S. patent application Ser. No. 10/937,976 has several passive cooling design features so that it is fanless and therefore, silent. It comprises a unique heat sink that supports the entire enclosure and causes heat in the device to dissipate through vents. The motherboard assembly attaches directly to the heat sink to facilitate thermal transfer characteristics so that components are cooled without the need for a fan. The heat sink further serves as the entire supporting structure of the circuit board assembly and is designed and incorporated into the device so that any stress experienced by the heat sink is not transferred to the solder joints. The entire PCB assembly moves with the heat sink.

The benefits provided by a fanless integrated display computer with peripherals include increased reliability and lower maintenance costs. The device never suffers from unreliability or damage due to fan failure. The natural convection process results in very light air inflow and almost completely eliminates internal dust build-up. There is no build-up of dust that is normally caused by the use of fans and that often leads to fan failures. As a result, maintenance costs associated with protecting components from fan failures, repairing and replacing fans, and repairing and replacing components damaged by fan failures are eliminated. Maintenance costs associated with repair and replacement of peripherals devices are also reduced because the peripherals are secured within and protected by the housing unit.

A fanless integrated display computer with peripherals is silent and therefore, suitable for many applications including use in hospitals, libraries, or any other location where the presence of noise and dust is a concern. It comprises an integrated display with peripherals attached to the sides of the display so it is very compact and suitable for use in locations where the availability of space is a concern.

In one application of the present invention in conjunction with a fanless integrated display computer, the computer may be mounted on a retail store shelf to provide product information to consumers shopping at a retail establishment. With the multitude of products available to today's consumer, and the wealth of information that now commonly exists with respect to such products, it is desirable for retail establishments to provide the consumer with an on-site and efficient means of accessing this additional information. Retailers can present the consumer with all, or a large portion of, such information at a single source. For example, when considering a foodstuff, typical information may be related to rebate instructions, the existence of coupons, special pricing, or features. The information may also be more product specific, such as the product's nutritional information, for example. Depending on the particular type of products considered and the level of detail desired, the amount of information that may be provided can be substantial. A fanless integrated display computer with a peripheral housing unit comprising a bar code scanner facilitates a consumer's access to product information by allowing the consumer to simply scan the product of interest. The amount of information that may be provided via the computer display is virtually endless.

BRIEF DESCRIPTION OF THE DRAWINGS

FIG. 2A is a front view, FIG. 2B is a top view, FIG. 2C is a side view, FIG. 2D is a rear view, and FIG. 2E is a perspective view of an insert faceplate shown in FIG. 1;

FIG. 3A is a front view, FIG. 3B is a side view, FIG. 3C is a rear view, FIG. 3D is a top view, and FIG. 3E is a perspective view of an end cap shown in FIG. 1;

FIG. 4A is a rear view, FIG. 4B is a side view, and FIG. 4C is a perspective view of a static discharge plate assembly shown in FIG. 1;

FIG. 4D is a side view, FIG. 4E is a front view, and FIG. 4F is a perspective view of a static discharge plate portion of the static discharge plate assembly shown in FIG. 1;

FIG. 5A is a top view, FIG. 5B is a side view, and FIG. 5C is a perspective view of a center spine portion of the static discharge plate assembly shown in FIGS. 4A-4C;

FIG. 6A is a front view, FIG. 6B is a side view, FIG. 6C is a rear view, and

FIG. 6D is a perspective view of an assembly bracket shown in FIG. 1;

FIG. 7A is a right side, FIG. 7B is a front view, FIG. 7C is a left side, FIG. 7D is a bottom view, and FIG. 7E is a perspective view of a pin protector shown in FIG. 1;

FIG. 8A is a bottom, FIG. 8B is a front view, FIG. 8C is a side, and FIG. 8D is a rear view of a shroud shown in FIG. 1; and FIG. 9A is a first perspective view, FIG. 9B is a second perspective view, and FIG. 9C is a front view of an integrated display computer with peripherals of the present invention assembled from the components shown in FIGS. 1-9.

DESCRIPTION OF EXAMPLE EMBODIMENTS

Figure 1:
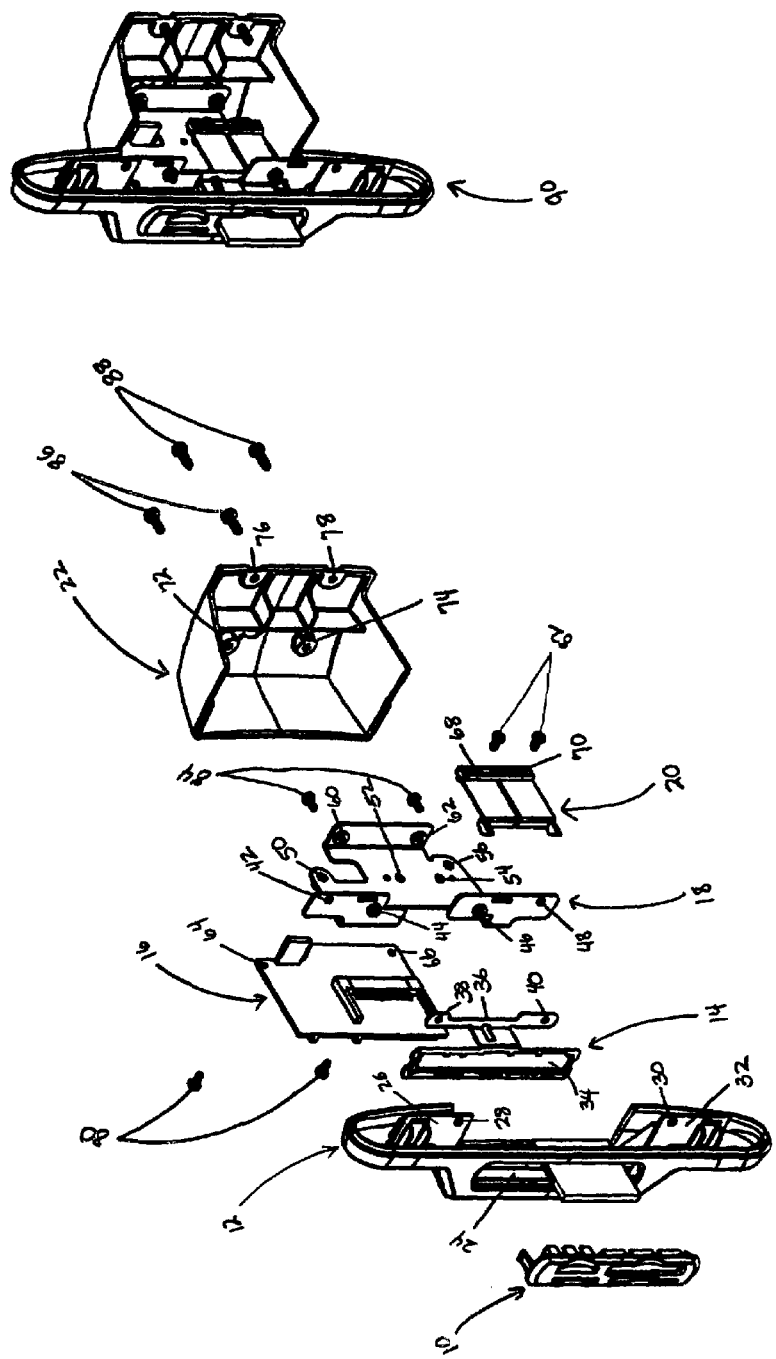
FIG. 1 is an assembly view of a peripheral housing unit of an example embodiment of the present invention.

Referring to FIG. 1, an assembly view of a peripheral housing unit for an example embodiment of the present invention is shown. The peripheral device shown for purposes of illustration in the example embodiment of FIG. 1 is a digital media card reader 16, such as a Zio™ Corporation 4 slot Dazzlee® digital media reader. Alternatively, other types of media card readers and other types of peripherals, such as bar code scanners or magnetic card readers, may be assembled into the peripheral housing unit of the present invention. Various types of USB peripherals as well as custom peripherals that use a serial port or a custom interface could also be integrated into the peripheral housing unit of the present invention.

This particular peripheral housing unit 90 for a media card reader comprises the following components: an insert faceplate 10 for accepting a media card from a user; an end cap 12 which accommodates the insert faceplate 10; a static discharge plate 14; an assembly bracket 18; a pin protector 20; and a shroud 22. The media card reader 16 to be installed within the housing unit 90 is also shown, although it should be understood that the housing unit may also be "blank" or contain a different type of peripheral.

The components of this particular peripheral housing unit are assembled as described below, although not necessarily in the order recited. The static discharge plate assembly 14 is attached to the assembly bracket 18. Fasteners 84 (e.g., pan fasteners) are used to connect the assembly bracket 18 to the static discharge plate assembly 14 via fastener openings 44, 46 on the assembly bracket 18 and fastener openings 38, 40 on the static discharge plate assembly 14. The insert faceplate 10 is snapped into an opening 24 in the end cap 12. The static discharge plate assembly 14 comprises an opening 34 so that a media card inserted by a user via the insert faceplate 10 can communicate with the digital media reader 16. The end cap 12 is attached to the front bezel 132 of a computer using tabs 26, 32 on the end cap 12 that comprise fastener openings 28, 30. The assembly bracket 18 is then assembled to the end cap/bezel assembly. The end cap fastener openings 28, 30 align with assembly bracket fastener openings 42, 48. The pin protector 20 attaches to the assembly bracket 18 using fasteners (e.g., pan fasteners) in pin protector fastener openings 68, 70 and assembly bracket fastener openings 52, 54. For purposes of illustration, in this particular embodiment the digital media reader 16 is attached to the assembly bracket 18 using fasteners (e.g., pan fasteners) in digital media reader fastener openings 64, 66 and assembly bracket fastener openings 50, 56. In other embodiments, the assembly bracket 18 may be adapted to receive different peripherals, which may attach thereto in a slightly different manner. Once the various internal components of the housing unit are assembled and the peripheral(s) is installed, the shroud 22 is attached to the assembly bracket 18 using fasteners (e.g., plastite fastners) 86 in shroud fastener openings 72, 74 and assembly bracket fastener openings 60, 62. Additional shroud fastener openings 76, 78 are subsequently used to help attach the completed peripheral housing unit 90 (e.g., using threaded fasteners 88) to the rear bezel 134 of the computer.

Referring to FIGS. 2A-2E, various views of an insert faceplate portion of the assembly shown in FIG. 1 can be seen. In an example embodiment of the present invention in which a 4 slot media card reader is installed in the peripheral housing unit, the insert faceplate may comprise different openings 90, 92 to accommodate different types of media cards as shown in the view of FIG. 2A. Tabs on the insert faceplate 94, 96 facilitate the installation of the faceplate into an end cap as shown in FIG. 2C. Once inserted into an end cap, the portion of the insert faceplate that is exposed is minimal as shown in FIG. 2B.

Various views of an end cap portion of the assembly shown in FIG. 1 can be observed by reference to FIGS. 3A-3E. As shown in FIGS. 3A and 3C, the end cap comprises tabs 26, 32 with openings 28, 30 for attaching the end cap to a front bezel 132 of an integrated display computer. The tabs are used to center the components, guide the assembly process, and affix the housing unit to the computer. The end cap further comprises a lip 100, 102 that facilitates the alignment of the end cap to the front bezel 132. An opening 24 in the end cap facilitates user access to the peripheral contained in the housing unit. The opening size and shape may vary depending upon the peripheral device housed in the unit.

The computer is designed to accept the end cap so that the end cap appears to form a finished side of the computer. End caps may extend from the top of the integrated display computer to the bottom or any portion of the length from the top to bottom. The length of the end caps may vary based upon the type of peripheral to be contained in the housing unit.

Referring to FIGS. 4A-4C, various views of a static discharge plate assembly 14 portion of the peripheral housing unit assembly shown in FIG. 1 can be seen. A plate portion 110 of the static discharge plate assembly can be observed in FIGS. 4D-4F. As shown in FIG. 4A, the static discharge plate assembly 14 comprises a plate 110 with an opening 34 to accommodate insertion of a card, disk, etc. into the peripheral device. It further comprises a mounting bracket 36 with fastener openings 38, 40 so that it may be attached to an assembly bracket within the housing unit. It also comprises a center spine 112 (see FIGS. 5A-5C) that may be attached to the plate 110 at various points 114, 116 and by various means. As shown in FIG. 4B, the mounting bracket 36 and the plate 110 may be connected via a tab member 118.

Referring to FIGS. 5A-5C, various views of the center spine 112 portion of the static discharge plate assembly 14 shown in FIGS. 4A-4C can be seen. The center spine may be attached to the plate 110 by various methods such as, for example, spot welding. The center spine 112 helps to maintain separation of the various media receptacles present in the media reader 16 used in this particular embodiment of the present invention.

Various views of an assembly bracket 18 portion of the assembly of FIG. 1 are shown in FIGS. 6A-6D. The assembly bracket comprises a support base 126 and perpendicular tab or flange members 120, 122, 124 on two sides of the support base. The support base 126 and the tab members 120, 122, 124 have fastener openings to accommodate fasteners for attaching other components of the peripheral housing unit to the assembly bracket. FIG. 6A is a front view of the assembly bracket 18 that shows two tab members 120, 124 that are situated at a forward end of the support base. A third tab member 122 is situated at an opposite end of the support base. Fastener openings 48, 42 on the respective outer ends of the tab members 120, 124 align with fastener openings on the end cap. Fastener openings 46, 44 on the respective inner ends of the tab members 120, 124 align with fastener openings on the static discharge plate.

FIG. 6B is a side view of the assembly bracket 18. The support base 126 comprises fastener openings 56, 50 that align with fastener openings on the digital media reader. Fastener openings 54, 52 on the support base 126 align with fastener openings on the pin protector. FIG. 6C is a rear view of the assembly bracket that shows the third tab member 122 situated at rearward end of the support base. Fastener openings 62, 60 on the third tab member 122 align with fastener openings on the shroud. FIG. 6D illustrates clearly the position of all of the fastener openings on the support base 122 and tab members 120, 122, 124 of the assembly bracket.

Referring to FIGS. 7A-7E, various views of a pin protector 20 portion of the assembly of FIG. 1 are shown. As shown most clearly in FIGS. 7A and 7C, the pin protector 20 includes fastener openings that allow for its attachment to the assembly bracket 18.

Referring to FIGS. 8A-8D, various views of a shroud 22 portion of the assembly of FIG. 1 are shown. Referring to FIG. 8B, the shroud can be seen to include fastener openings 72, 74 for attaching the shroud 20 to the assembly bracket 18. The shroud 20 houses the assembly bracket 18 and peripheral device (in this case, media card reader 16) to provide protection to the peripheral device. The design of the shroud 20 also facilitates its connection to the computer, such as via fastener openings 76, 78 and fasteners 88 that cooperate to affix the shroud 20 to the rear bezel 134 of the integrated display computer 140. Consequently, when the components of the housing unit 90 are assembled as shown in FIG. 1, the design of the shroud 20 assists in retaining the completed housing unit on the integrated display computer 140. As best indicated in FIGS. 8C and 9B, a portion of the shroud 20 remains exposed after it is attached to the computer.

Referring now to FIGS. 9A-9C, various views of an integrated display computer with peripherals according to an example embodiment of the present invention are shown. As FIGS. 9A-9C indicate, once attached to the integrated display computer 140, the peripheral housing unit 90 appears to be an integral part of the computer. FIG. 9b is a rear perspective view of the integrated display computer 140 with an attached peripheral housing unit 90. Fastener openings 72, 74 have been used to attach the shroud 20 to the assembly bracket 18 and fastener openings 76, 78 are used to attach the completed peripheral housing unit 90 to the computer.

The enclosed peripheral provides extra functionality for the integrated display computer. As should be apparent from FIGS. 9A-9C, peripheral housing units may be attached to either or both sides of the integrated display unit. Although the present invention has been explained in accordance with an example embodiment of the present invention wherein a digital media reader is enclosed in a peripheral housing unit, other types of peripherals such as magnetic card readers and bar code scanners may be enclosed similarly. The universal attachment design of the present invention allows other types of peripherals to be incorporated easily into the peripheral housing unit thereby increasing the available functionality. Furthermore, the peripheral housing unit may comprise a "blank" so that the integrated display computer can be finished with similar units that do not comprise peripheral functionality.

In an example embodiment of the present invention, the peripherals that are contained in a housing unit are peripherals that pass FCC testing (EMI) and UL as stand-alone peripherals. Many personal computer USB peripherals that could be contained in the housing unit are stand-alone peripherals that meet such requirements. A ground path through housing unit and associated metal bracketry provides static discharge so that once attached, the peripheral housing unit and integrated display computer, which also meets FCC (EMI) and UL requirements, form a single unit that meets the applicable requirements.

The ability to attach various types of housing units, functional or non-functional, allows the integrated display computer to be configured for many applications. Such applications include use in retail stores, advertising and informational promotions, schools, libraries, and hospitals. The computers are also suitable for use in many different settings including high-traffic settings. The peripherals are well-protected and securely attached to the computer. Therefore, they are unlikely to be disturbed or detached during normal operation. Finally, the housing units may be adapted for integrated display computers of many sizes. Any limitations on size may be dictated by the size of actual peripheral device rather than the other components comprising the peripheral housing unit.

Integrated display computers with peripherals according to the present invention provide substantial functionality in an attractive package. While example embodiments of the invention have been illustrated and described, various modifications and combinations can be made without departing from the spirit and scope of the invention. Many types of peripheral devices may be designed and manufactured for attachment to an integrated display computer according to the apparatus and method of the present invention and still fall within the scope of the present invention. Peripheral housing units according to the present invention may be attached to the top and bottom of a computer in addition to the sides of a computer. Finally, peripheral housing units according to the present invention may be attached to conventional display monitors in addition to integrated display computers. Modifications, combinations, and equivalents to the system and method of the present invention are intended to be covered and claimed.

What is claimed is:

1. A peripheral housing unit for containing and attaching one of a plurality of different peripheral devices to a computer comprising:
    an end cap having a common end cap fastening means for use with any one of said plurality of different peripheral devices and for attaching said end cap to an external portion of a front bezel of said computer, and an opening of a size and shape for accommodating a faceplate to permit user communication with a peripheral device contained in said housing unit;
    a shroud having a common shroud fastening means for use with any one of said plurality of different peripheral devices and for attaching said shroud to an external portion of a rear bezel of said computer; and
    an assembly bracket including a first fastening means for attaching said end cap to said assembly bracket, a second fastening means for attaching said peripheral device to said assembly bracket, and a third fastening means for attaching said shroud to said assembly bracket,
    wherein said end cap and said shroud cooperate to contain said peripheral device and to attach said peripheral device to said computer using said common end cap fastening means and said common shroud fastening means.

2. The peripheral housing unit of claim 1 wherein said peripheral housing unit is attached to a side of said computer.

3. The peripheral housing unit of claim 1 wherein said housing unit contains a peripheral device selected from the group consisting of digital media card readers, bar code scanners, and magnetic card readers.

4. The peripheral housing unit of claim 1 wherein said faceplate comprises a plurality of different openings that permit access to said peripheral device.

5. The peripheral housing unit of claim 1 further comprising a connecting means for connecting said peripheral device to a port of said computer.

6. The peripheral housing unit of claim 1 further comprising a static discharge plate connected between said end cap and said assembly bracket.

7. The peripheral housing unit of claim 1 wherein said computer is an integrated display computer.

8. The peripheral housing unit of claim 1 wherein said computer is a fanless integrated display computer.

9. A method for attaching one of a plurality of different peripheral devices to a computer comprising:
    attaching an end cap to an external portion of a front bezel of said computer using said end cap fastening means, said end cap having a universal end cap fastening means for use with any one of said peripheral devices and an opening of a size and shape for accommodating a faceplate to permit access to a peripheral device to be attached to said computer;
    attaching an assembly bracket to said end cap using a first fastening means for said assembly bracket;

attaching said peripheral device to said assembly bracket using a second fastening means for said assembly bracket;

connecting said peripheral device to a corresponding port of said computer;

attaching a shroud to said assembly bracket using a third fastening means for said assembly bracket; and attaching said shroud to an external portion of a rear bezel of said computer using a shroud fastening means for use with any one of said plurality of peripheral devices, thereby completing a peripheral housing unit;

wherein said peripheral device is enclosed within said peripheral housing unit, with a portion of said peripheral device accessible through said opening in said end cap.

10. The method of claim 9 wherein said peripheral housing unit is attached to a side of said computer.

11. The method of claim 9 wherein said peripheral device is selected from the group consisting of digital media card readers, bar code scanners, and magnetic card readers.

12. The method of claim 9 wherein said faceplate comprises a plurality of different openings that permit access to said peripheral device.

13. The method of claim 9 further comprising installing a static discharge plate between said end cap and said assembly bracket.

14. The method of claim 9 wherein said computer is an integrated display computer.

15. The method of claim 9 wherein said computer is a fanless integrated display computer.

16. An integrated display computer with at least one of a plurality of different peripheral devices comprising:

an end cap attached to an external portion of an existing front bezel of said integrated display computer using an end cap universal attachment means, wherein said end cap forms a finished side of said integrated display computer;

an opening in said end cap of a size and shape for accommodating a faceplate for accessing said peripheral device after said peripheral device has been attached to said computer;

an assembly bracket attached at a forward end to said end cap;

a peripheral device affixed to said assembly bracket and connected to a respective port of said computer; and a shroud for housing at least a portion of said assembly bracket and said peripheral device, said shroud attached at one end to a rearward end of said assembly bracket and at another end to an external portion of a rear bezel of said computer using a shroud universal attachment means;

wherein the assembly of said shroud to said end cap forms an enclosed housing unit in which said peripheral device is contained and which is attached to said external portions of said computer.

17. The integrated display computer of claim 16 wherein said peripheral device is selected from the group consisting of digital media card readers, bar code scanners, and magnetic card readers.

18. The integrated display computer of claim 16 wherein said faceplate comprises a plurality of different openings to permit access to said peripheral device.

19. The integrated display computer of claim 16 wherein said integrated display computer is a fanless computer.

20. The integrated display computer of claim 16 wherein a housing unit is also located on an opposite side of said integrated display computer, said housing unit optionally including a second peripheral device.

* * * * *

UNITED STATES PATENT AND TRADEMARK OFFICE
CERTIFICATE OF CORRECTION

| | | |
|---|---|---|
| PATENT NO. | : 7,397,659 B1 | Page 1 of 1 |
| APPLICATION NO. | : 11/131052 | |
| DATED | : July 8, 2008 | |
| INVENTOR(S) | : Michael A. Curran and Gary A. Peck | |

It is certified that error appears in the above-identified patent and that said Letters Patent is hereby corrected as shown below:

Title Pg. Item (56), OTHER PUBLICATIONS, please delete "Judos" and insert -- Kudos --

In Column 4, lines 38-41 should be one paragraph and read: FIG. 6A is a front view, FIG. 6B is a side view, FIG. 6C is a rear view, and FIG. 6D is a perspective view of an assembly bracket shown in FIG. 1

In Column 4, line 60, please delete "Dazzlee" and insert -- Dazzle --

In Column 6, line 65, please delete "devicen" and insert -- device in --

Signed and Sealed this

Twenty-sixth Day of August, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,397,659 B1 | Page 1 of 1 |
| APPLICATION NO. | : 11/131052 | |
| DATED | : July 8, 2008 | |
| INVENTOR(S) | : Michael A. Curran and Gary A. Peck | |

It is certified that error appears in the above-identified patent and that said Letters Patent is hereby corrected as shown below:

Title Pg, Item (56), page 2 - U.S. PATENT DOCUMENTS, please add: 20050270728 A1* 12/2005 Chen, et al....361/681

Signed and Sealed this

Twenty-first Day of October, 2008

JON W. DUDAS
*Director of the United States Patent and Trademark Office*